(12) United States Patent
Klode

(10) Patent No.: US 11,788,561 B2
(45) Date of Patent: Oct. 17, 2023

(54) HYDRAULIC FLUID FLOW CONTROL

(71) Applicant: GOODRICH CORPORATION, Charlotte, NC (US)

(72) Inventor: Harald Klode, Centerville, OH (US)

(73) Assignee: GOODRICH CORPORATION, Charlotte, NC (US)

(*) Notice: Subject to any disclaimer, the term of this patent is extended or adjusted under 35 U.S.C. 154(b) by 163 days.

(21) Appl. No.: 17/192,665

(22) Filed: Mar. 4, 2021

(65) Prior Publication Data
US 2021/0324881 A1 Oct. 21, 2021

Related U.S. Application Data

(60) Provisional application No. 63/010,397, filed on Apr. 15, 2020.

(51) Int. Cl.
*F16D 57/00* (2006.01)
*F16H 61/444* (2010.01)
(Continued)

(52) U.S. Cl.
CPC ............ *F15B 15/02* (2013.01); *F16D 57/002* (2013.01); *F16F 9/532* (2013.01); *F16F 9/535* (2013.01);
(Continued)

(58) Field of Classification Search
CPC ........ F15B 2211/40; F15B 2211/40538; F15B 2211/715; F16D 57/002; F16F 9/532; F16F 9/535; F16H 61/44; F16H 61/444
See application file for complete search history.

(56) References Cited

U.S. PATENT DOCUMENTS 4,926,985 A * 5/1990 Mizuno .................. F16F 9/532
267/136
5,161,653 A 11/1992 Hare, Sr.
(Continued)

FOREIGN PATENT DOCUMENTS

CN 204355018 5/2015
CN 206386221 8/2017
(Continued)

OTHER PUBLICATIONS

European Patent Office, European Search Report dated Sep. 20, 2021 in Application No. 21168146.5.
(Continued)

*Primary Examiner* — Kenneth Bomberg
*Assistant Examiner* — Matthew Wiblin
(74) *Attorney, Agent, or Firm* — SNELL & WILMER L.L.P.

(57) ABSTRACT

A hydraulic fluid system is disclosed and that utilizes a hydraulic motor or gear pump and a magneto-rheological fluid (MRF) brake that is interconnected with an output of the hydraulic motor. The MRF brake may utilize a rotatable rotor that is disposed within a magneto-rheological fluid and that is interconnected with an output (e.g., a rotatable output shaft) of the hydraulic motor. An electrical control signal may be provided to the MRF brake (e.g., to a magnetic coil) to adjust the viscosity of the magneto-rheological fluid, and thereby a braking torque exerted on the output of the hydraulic motor.

15 Claims, 4 Drawing Sheets

(51) Int. Cl.
*F16H 61/44* (2006.01)
*F16F 9/53* (2006.01)
*F15B 15/02* (2006.01)

(52) U.S. Cl.
CPC ........... *F16H 61/44* (2013.01); *F16H 61/444* (2013.01); *F15B 2211/40* (2013.01); *F15B 2211/40538* (2013.01); *F15B 2211/715* (2013.01)

(56) References Cited

U.S. PATENT DOCUMENTS

| | | | |
|---|---|---|---|
| 6,352,143 B1 * | 3/2002 | Niaura | F16F 9/532 |
| | | | 188/267.2 |
| 6,854,573 B2 * | 2/2005 | Jolly | F16D 57/002 |
| | | | 188/161 |
| 6,910,699 B2 * | 6/2005 | Cherney | B62D 12/00 |
| | | | 188/267.2 |
| 8,333,069 B2 | 12/2012 | Heren et al. | |
| 8,622,864 B2 | 1/2014 | Fauteux et al. | |
| 2012/0291732 A1 | 11/2012 | Oe et al. | |
| 2018/0216682 A1 | 8/2018 | Larose et al. | |
| 2018/0298976 A1 * | 10/2018 | Battlogg | F16F 9/12 |
| 2019/0040927 A1 * | 2/2019 | Funke | F16F 9/46 |
| 2019/0345841 A1 | 11/2019 | Kang | |

FOREIGN PATENT DOCUMENTS

| | | |
|---|---|---|
| CN | 109941902 | 6/2019 |
| EP | 1482200 | 12/2004 |
| JP | 06953069 | 10/2021 |
| WO | 2019052072 | 3/2019 |

OTHER PUBLICATIONS

Database WPI Week 201962 Thomson Scientific, London, GB; AN 2019-58452V XP002804156, 1 page.
USPTO; Non-Final Office Action dated Jun. 16, 2023 in U.S. Appl. No. 17/723,891.

* cited by examiner

HYDRAULIC FLUID FLOW CONTROL

CROSS-REFERENCE TO RELATED APPLICATIONS

This patent application is a non-provisional patent application of, and claims the benefit of, U.S. Provisional Patent Application Ser. No. 63/010,397, that is entitled "HYDRAULIC FLUID FLOW CONTROL," that was filed on 15 Apr. 2020, and the entire disclosure of which is hereby incorporated by reference in its entirety herein.

FIELD

The present disclosure generally relates to hydraulics and, more particularly, to controlling hydraulic fluid flow.

BACKGROUND

Existing applications that use magneto-rheological (MR) fluid to manipulate the fluid pressure relationship in a hydraulic fluid system are typically limited to applications compatible with certain MR fluid properties. MR fluid has a high weight/density and includes ferromagnetic particles. Various aerospace applications prefers recirculation of hydraulic fluid that is void of any contaminants and provides the relatively low fluid weight.

SUMMARY

A hydraulic fluid system is presented herein. Both the configuration of such a hydraulic fluid system and the operational characteristics of such a hydraulic fluid system are within the scope of this Summary.

A hydraulic fluid system may include a hydraulic motor (e.g., a gear pump) and a magneto-rheological fluid (MRF) brake. This MRF brake may be interconnected with an output of the hydraulic motor (e.g., a rotatable output shaft). A hydraulic fluid circuit may be fluidly connected with the hydraulic motor. The magneto-rheological fluid (e.g., including ferromagnetic particles) of the MRF brake may be fluidly isolated from this hydraulic fluid circuit. A static or fixed quantity of the magneto-rheological fluid may be contained within the MRF brake. The MRF brake may be configured such that magneto-rheological fluid is not recirculated from outside the MRF brake, into/through the MRF brake, out of the MFB brake, and then back into the MRF brake (e.g., no exiting and re-entering of magneto-rheological fluid from and back into the MRF brake).

The MRF brake may include a rotor (e.g., rotatable) that is disposed within the magneto-rheological fluid, This rotor may be interconnected with the output of the hydraulic motor. An electrical control signal to the MRF brake (e.g., to a coil) may be used to control the viscosity of the magneto-rheological fluid, which in turn may control a braking torque exerted by the MRF brake on the output of the hydraulic motor.

The hydraulic motor and MRF brake may be of an integrated configuration. A common housing assembly may contain the hydraulic motor and the MRF brake. The hydraulic motor may be disposed within a motor housing, the MRF brake may be disposed in a brake housing, and a housing may be disposed between and engage each of the motor housing and the brake housing.

A pair of the noted hydraulic motor and MRF brake may be disposed in series (e.g., a first hydraulic motor and a corresponding first MRF brake, may be disposed in series with a second hydraulic motor and a corresponding second MRF brake). A first pair of the noted hydraulic motor and MRF brake (e.g., a first hydraulic motor and a corresponding first MRF brake, a second hydraulic motor and a corresponding second MRF brake) may be disposed in series, a second pair of the noted hydraulic motor and MRF brake (e.g., a third hydraulic motor and a corresponding third MRF brake; a fourth hydraulic motor and a corresponding fourth MRF brake) may be disposed in series, and the first pair and second pair may be interconnected in parallel. The first pair and the second pair may be fluidly connected with a common hydraulic load.

Various aspects of the present disclosure are also addressed by the following paragraphs and in the noted combinations:

1. A hydraulic fluid system, comprising:
   a hydraulic motor comprising an output; and
   a magneto-rheological fluid (MRF) brake interconnected with said output of said hydraulic motor, wherein said MRF brake comprises a magneto-rheological fluid.
2. The hydraulic fluid system of paragraph 1, wherein said hydraulic motor comprises an idler gear and an output gear, and wherein said MRF brake is interconnected with said output gear.
3. The hydraulic fluid system of any of paragraphs 1-2, further comprising:
   a hydraulic fluid circuit fluidly connected with said hydraulic motor, wherein said magneto-rheological fluid of said MRF brake is fluidly isolated from said hydraulic fluid circuit.
4. The hydraulic fluid system of any of paragraphs 1-2, further comprising:
   a working fluid; and
   a control fluid that is fluidly isolated from said working fluid.
5. The hydraulic fluid system of paragraph 4, wherein said hydraulic motor comprises said working fluid and said magneto-rheological fluid of said MRF brake comprises said control fluid.
6. The hydraulic fluid system of any of paragraphs 1-5, wherein said MRF brake comprises a coil.
7. The hydraulic fluid system of paragraph 6, wherein said MRF brake comprises an electrical control signal input to said coil.
8. The hydraulic fluid system of any of paragraphs 6-7, wherein an amount of current flowing through said coil of said MRF brake corresponds with a viscosity of said magneto-rheological fluid of said MRF brake.
9. The hydraulic fluid system of any of paragraphs 1-8, wherein said MRF brake comprises a controller.
10. The hydraulic fluid system of paragraph 9, wherein an input to said controller is selected from the group consisting of a differential pressure of said hydraulic motor and an operational speed of said hydraulic motor.
11. The hydraulic fluid system of any of paragraphs 1-10, further comprising a shaft assembly, wherein a first shaft segment of said shaft assembly comprises an output shaft of said hydraulic motor, wherein a second shaft segment of said shaft assembly extends between said hydraulic motor and said MRF brake, and wherein a third shaft segment of said shaft assembly extends into said MRF brake.
12. The hydraulic fluid system of any of paragraphs 1-11, wherein said MRF brake comprises a rotatable rotor disposed within said magneto-rheological fluid.
13. The hydraulic fluid system of any of paragraphs 1-12, wherein said hydraulic motor comprises a motor housing and said MRF brake comprises a brake housing, and wherein motor housing is completely separate from said brake housing.
14. The hydraulic fluid system of any of paragraphs 1-13, further comprising a second hydraulic motor and a second MRF brake operatively interconnected with said second hydraulic motor and that defines a second set, wherein said hydraulic motor and said MRF brake define a first set, and wherein said first set and said second set are connected in series.
15. The hydraulic fluid system of paragraph 14, further comprising:
a third hydraulic motor and a third MRF brake operatively interconnected with said third hydraulic motor and that defines a third set; and
a fourth hydraulic motor and a fourth MRF brake operatively interconnected with said fourth hydraulic motor and that defines a fourth set, wherein said third set and said fourth set are connected in series.
16. The hydraulic fluid system of paragraph 15, wherein said first set and said second set are collectively connected in parallel with said third set and said fourth set.
17. The hydraulic fluid system of any of paragraphs 15-16, further comprising a common hydraulic load fluidly connected with each of said hydraulic motor, said second hydraulic motor, said third hydraulic motor, and said fourth hydraulic motor.
18. The hydraulic fluid system of paragraph 17, wherein said hydraulic load is an aircraft component.
19. The hydraulic fluid system of any of paragraphs 1-11, further comprising a housing assembly, wherein said hydraulic motor and said MRF brake are disposed within said housing assembly.
20. The hydraulic fluid system of any of paragraphs 1-12 and 19, further comprising a first shaft, wherein said output comprises an output gear mounted on said first shaft at a first location, and wherein said MRF brake comprises a rotor mounted on said first shaft at a second location that is spaced from said first location.
21. The hydraulic fluid system of paragraph 20, wherein said rotor is disposed within said magneto-rheological fluid.
22. The hydraulic fluid system of any of paragraphs 20-21, further comprising a seal engaged with said first shaft between said first location and said second location.
23. The hydraulic fluid system of any of paragraphs 19-22, wherein said housing assembly comprises a motor housing, a brake housing, and a housing disposed between and engaged with each of said motor housing and said brake housing.
24. The hydraulic fluid system of any of paragraphs 1-23, further comprising a hydraulic controller, said hydraulic controller comprising a combination of said hydraulic motor and said MRF brake.
25. A method of controlling a hydraulic fluid system, comprising:
directing a hydraulic fluid through a hydraulic motor comprising an output; and
applying a braking torque to said output, said applying comprising using a magneto-rheological fluid.
26. The method of paragraph 25, wherein said directing comprises inputting said hydraulic fluid to said hydraulic motor and outputting said hydraulic fluid from said hydraulic motor, wherein a pressure of said hydraulic fluid for said inputting is greater than a pressure of said hydraulic fluid for said outputting.
27. The method of any of paragraphs 25-26, further comprising:
rotating an output shaft of said hydraulic motor using said directing, wherein said applying comprises applying said braking torque to said output shaft.
28. The method of any of paragraphs 25-27, further comprising controlling a magnitude of said braking torque using a current applied to said magneto-rheological fluid.
29. The method of any of paragraphs 25-28, further comprising:
isolating said hydraulic fluid from said magneto-rheological fluid.
30. The method of any of paragraphs 25-29, wherein said using a magneto-rheological fluid comprises using a fixed quantity of said magneto-rheological fluid.
31. The method of any of paragraphs 25-30, wherein said applying comprises:
using a magneto-rheological fluid brake; and
precluding recirculation of said magneto-rheological fluid from outside said magneto-rheological fluid brake, through said magneto-rheological fluid brake, out of said magneto-rheological fluid brake, and then back into said magneto-rheological fluid brake.

DETAILED DESCRIPTION

Figure 1:
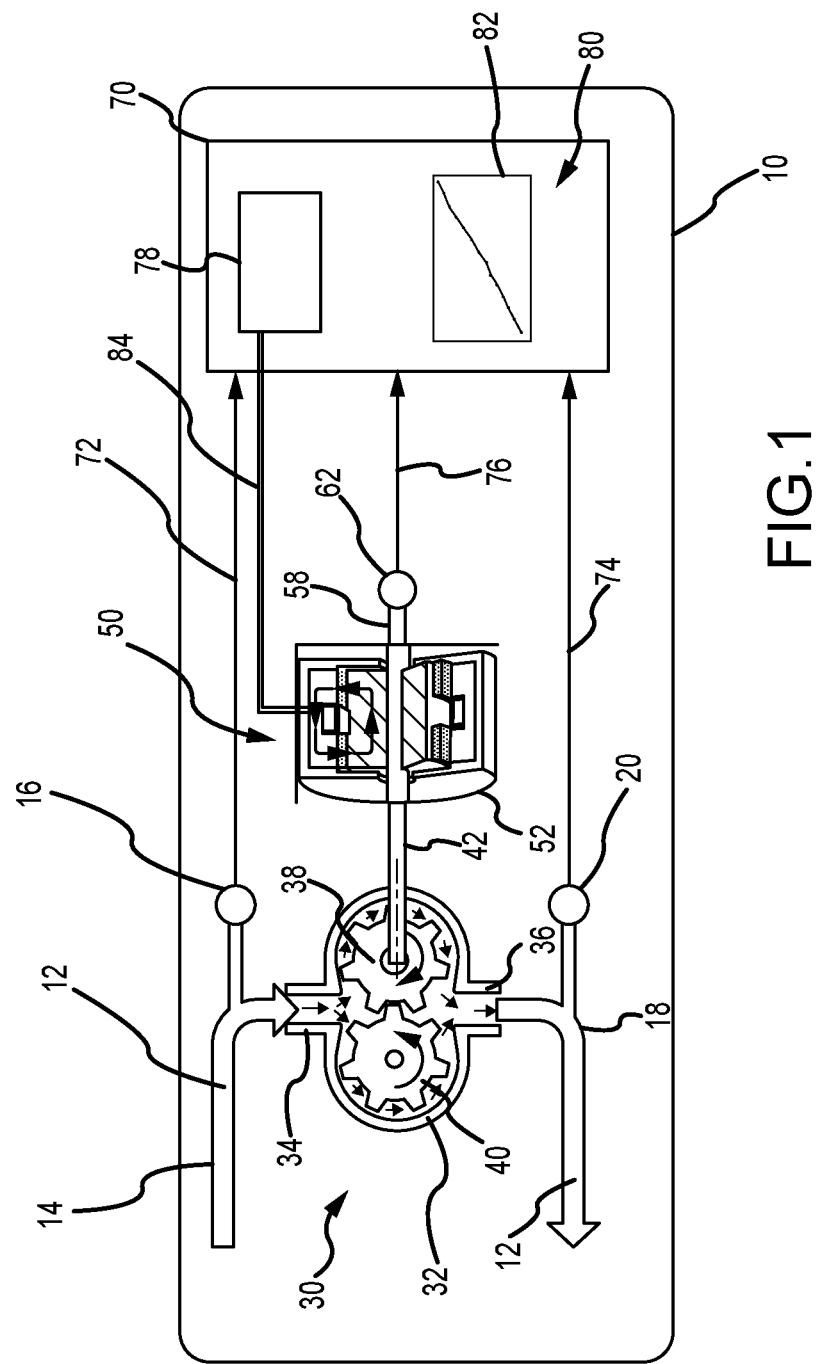
FIG. 1 is a schematic of a hydraulic fluid system that uses a hydraulic motor and separate MRF brake, in accordance with various embodiments.

A hydraulic fluid system in accordance with various embodiments is illustrated in FIG. 1 and is identified by reference numeral 10. The hydraulic fluid system 10 includes a hydraulic motor 30 (e.g., a gear pump), an MRF brake 50, and a controller 70. The hydraulic motor 30 and MRF brake 50 are separate components in the case of the hydraulic fluid system 10, and may be disposed in spaced relation to one another. Generally, the MRF brake 50 may be operated to control a magnitude of a braking torque exerted on the hydraulic motor 30, and the magnitude of this braking torque is adjustable. In the case of the hydraulic fluid system 10, the hydraulic motor 30 may be characterized as an adjustable orifice for the hydraulic fluid system 10 (e.g., fluid pressure from one or more devices fluidly connected with the hydraulic motor 30 drive the hydraulic motor 30 (e.g., a gear pump 30), and the MRF brake 50 would in turn be used to control how the hydraulic motor 30 resists the fluid pressure from each such device). The hydraulic motor 30, MRF brake 50, and controller 70 collectively control the flow of the hydraulic fluid 12 within the hydraulic fluid system 10 and the pressure of the hydraulic fluid 12 within the hydraulic fluid system 10. Representative applications of the hydraulic fluid system 10 include a hydraulic damper (e.g., a shimmy damper for nose wheel steering on an aircraft, as an adjustable orifice to control the "free fall" characteristics of hydraulically-actuated landing gear for aircraft, or any other application that would benefit from having a hydraulic fluid restriction (the combination of the hydraulic motor 30 and MRF brake 50) that can be controlled quickly and in real time.

A hydraulic fluid 12 of any appropriate type is directed through a hydraulic fluid input line 14 and into an input port 34 of a motor housing 32 of the hydraulic motor 30. A hydraulic fluid output line 18 extends from an output port 36 of the motor housing 32. The hydraulic fluid input line 14, the hydraulic fluid output line 18, or both, may be interconnected with a hydraulic fluid source, such as an accumulator, and one or more other devices. At least one pressure transducer/sensor 16 may be associated with the hydraulic fluid input line 14, at least one pressure transducer/sensor 20 may be associated with the hydraulic fluid output line 18, or both.

The hydraulic motor 30 may include an output gear 38 and an idler gear 40. Hydraulic fluid 12 that enters the motor housing 32 simultaneously rotates the output gear 38 and idler gear 40. An output shaft 42 may be interconnected and rotate with the output gear 38. The output shaft 42 may also extend to the MRF brake 50.

Figure 1A:
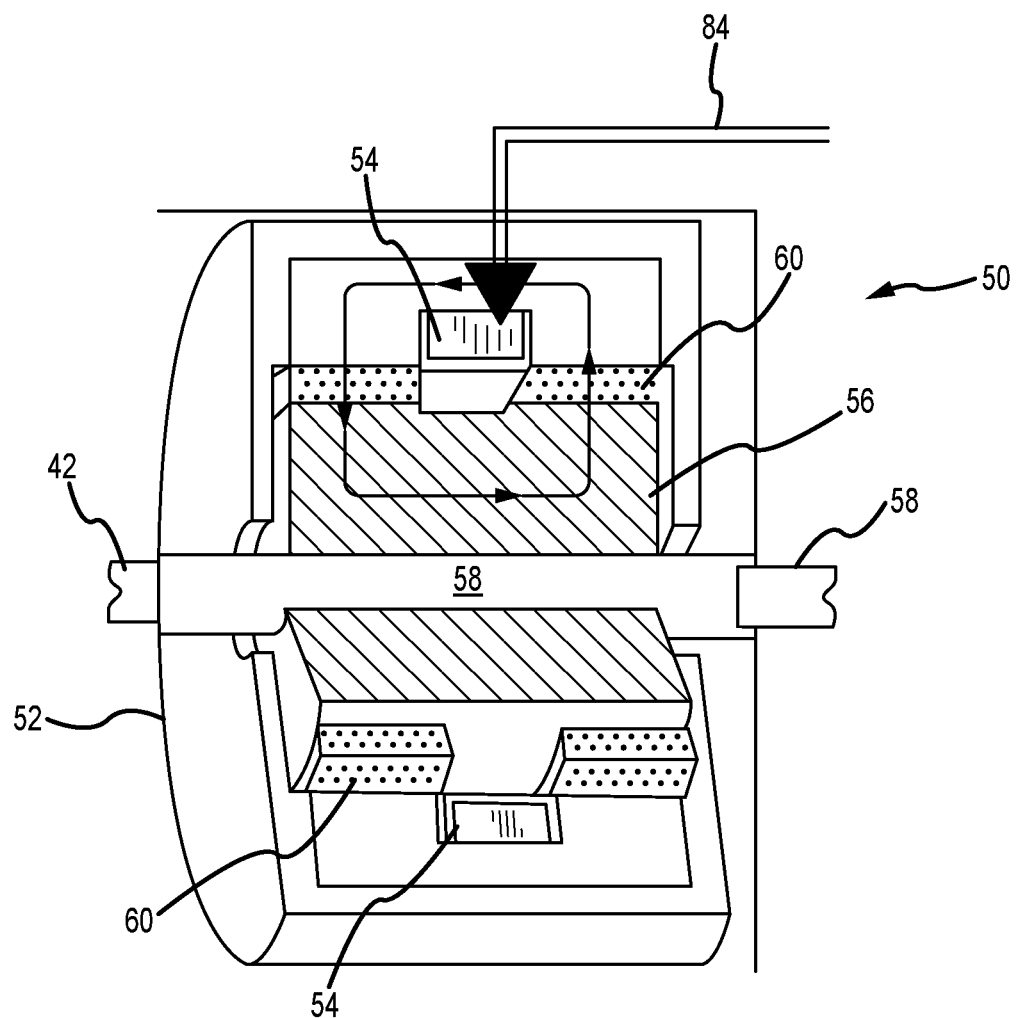
FIG. 1A is an enlarged view of the MRF brake used by the hydraulic fluid system shown in FIG. 1.

The MRF brake 50 is illustrated in FIG. 1 and FIG. 1A. The MRF brake 50 includes a brake housing 52. The brake housing 52 may be spaced from the motor housing 32. The hydraulic fluid system 10 may also be configured such that the motor housing 32 and brake housing 52 do not share any common housing section.

The MRF brake 50 includes a magnetic coil 54, a rotor 56, and a rotor shaft 58. The output shaft 42 of the hydraulic motor 30 may be coupled with the rotor shaft 58 of the MRF brake 50 such that the output shaft 42, rotor shaft 58, and rotor 56 collectively rotate at a common rotational speed (with rotor 56 and rotor shaft 58 being rotatable relative to the brake housing 52). A speed transducer/sensor 62 may be associated with the rotor shaft 58 (e.g., to monitor a rotational speed of the rotor shaft 58).

At least a portion of at least one of the rotor 56 and rotor shaft 58 may be exposed to a magneto-rheological fluid 60, including with the rotor 56 is disposed in the magneto-rheological fluid 60. A fixed quantity of the magneto-rheological fluid 60 may be contained/retained within the brake housing 52. Stated another way, the magneto-rheological fluid 60 may be incorporated so as to not be recirculated through the brake housing 52 (e.g., the magneto-rheological 60 does not flow from a fluid source (e.g., an accumulator) through one or more input ports of the brake housing 52, and then exit the brake housing 52 through one or more output ports and then back to the fluid source during operation of the MRF brake 50).

The controller 70 may be operatively interconnected with the MRF brake 50 by an electrical signal control line 84 that extends from the controller 70 to the magnetic coil 54 of the MRF brake 50. Generally, an electrical control signal is sent from the controller 70 to the magnetic coil 54 via the signal line 84. Increasing the current of this electrical control signal increases the viscosity of the magneto-rheological fluid 60 in the MRF brake 50, which increases the braking torque applied by the MRF brake 50 to the output shaft 42 of the hydraulic motor 30. Similarly, decreasing the current of this electrical control signal decreases the viscosity of the magneto-rheological fluid 60 in the MRF brake 50, which decreases the braking torque applied by the MRF brake 50 to the output shaft 42 of the hydraulic motor 30.

A high pressure signal line 72 may extend from the pressure transducer 16 of the hydraulic motor 30 to the controller 70 (an input to the controller 70). A low pressure signal line 74 may extend from the pressure transducer 20 of the hydraulic motor 30 to the controller 70 (an input to the controller 70). A rotational speed signal line 76 may extend from the speed transducer/sensor 62 to the controller 70.

The controller 70 may be configured to utilize a pressure control logic. The monitored pressure on the input side of the hydraulic motor 30 (via pressure transducer 16) and the monitored pressure on the output side of the hydraulic motor 30 (via pressure transducer 20) may be used to determine a corresponding differential pressure between the input side and output side of the hydraulic motor 30, and this differential pressure may be used to generate an electrical control signal that provides a corresponding braking torque. A data structure 82 (e.g., a look-up table) in memory 80 (e.g., computer-readable) may correlate a certain differential pressure to a braking torque and an associated current for the electrical control signal. An MRF brake driver 78 of the controller 70 may generate and send an electrical control signal to the coil 54 of the MRF brake 50 (via the electrical control signal line 84) that yields the desired differential pressure (between the input side and output side of the hydraulic motor 30) and a corresponding desired braking torque (via producing a certain viscosity of the magneto-rheological fluid 60 via the current of the electrical control signal).

The controller 70 could also be configured to utilize a flow control logic. The flow rate through the hydraulic motor 30 may be correlated to a differential pressure between the input side of the hydraulic motor 30 (via pressure transducer 16) and the output side of the hydraulic motor 30 (via pressure transducer 20). The data structure 82 (e.g., a look-up table) in memory 80 may correlate a certain rotational speed of the rotor shaft 58 to a braking torque and an associated current for the electrical control signal. The MRF brake driver 78 of the controller 70 may generate and send an electrical control signal to the coil 54 of the MRF brake 50 (via the control signal line 84) that yields a desired rotational speed of the rotor shaft 58 and a corresponding desired braking torque (via producing a certain viscosity of the magneto-rheological fluid 60 via the current of the electrical control signal).

Figure 2:
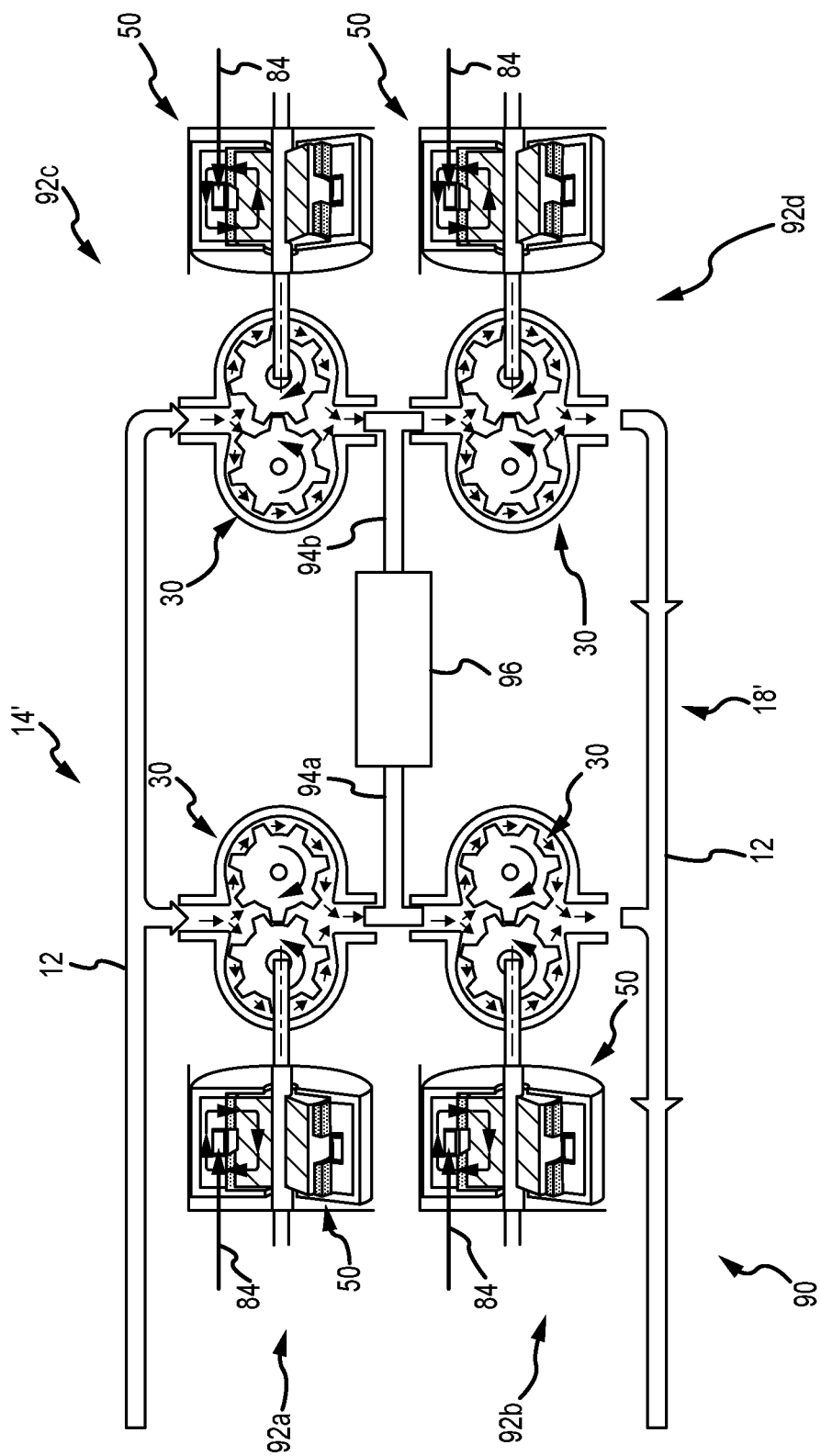
FIG. 2 is a schematic of a hydraulic fluid system that uses multiple MRF brakes, in accordance with various embodiments.

A hydraulic fluid system in accordance with various embodiments is illustrated in FIG. 2 and is identified by reference numeral 90. The hydraulic fluid system 90 includes four motor/brake sets 92a, 92b, 92c, and 92d. The configuration of each of these motor/brake sets 92a, 92b, 92c, and 92d is at least generally in accordance with the discussion presented above regarding FIGS. 1 and 1A. The motor/brake sets 92a and 92b are disposed in series with one another, the motor/brake sets 92c and 92d are disposed in series with one another, and the motor/brake sets 92a, 92b are collectively disposed in parallel to the motor/brake sets 92c, 92d. The motor/brake sets 92a, 92b, 92c, and 92d in effect define a hydraulic bridge circuit. The output pressure and flow (magnitude and direction) may be controlled by adjusting the individual currents in the coil 54 of the four MRF brakes 50.

The hydraulic fluid input line 14' extends to the input port 34 of the hydraulic motor 30 of the motor/brake sets 92a, 92c, while the hydraulic fluid output line 18' extends from the output port 36 of the hydraulic motor 30 of the motor/brake sets 92b, 92d. A hydraulic line 94a extends from the output port 36 of the hydraulic motor 30 for the motor/brake set 92a to the input port 34 of the hydraulic motor 30 for the motor/brake set 92b, and also extends to a hydraulic load 96. A hydraulic line 94b extends from the output port 36 of the hydraulic motor 30 for the motor/brake set 92c to the input port 34 of the hydraulic motor 30 for the motor/brake set 92d, and also extends to the hydraulic load 96 (via an electrical control signal via the corresponding signal line 84).

In the case of the hydraulic fluid system 90, the pressure in the hydraulic fluid input line 14' may be constant, and the pressure in the hydraulic fluid output line 18' may be constant. The motor/brake sets 92a, 92b, 92c, and 92d in the case of the hydraulic fluid system 90 may be used to control the hydraulic load 96. Representative hydraulic loads 96 include without limitation an aircraft component. The hydraulic load 96 may be a hydraulic actuator (e.g., a wheel brake actuator of an aircraft to control brake torque), a hydraulic (rotary) motor that drives an actuator, a vehicle, or any other device that requires the conversion of hydraulic power (the product of flow and pressure) into another form of mechanical (motive) energy.

Figure 3:
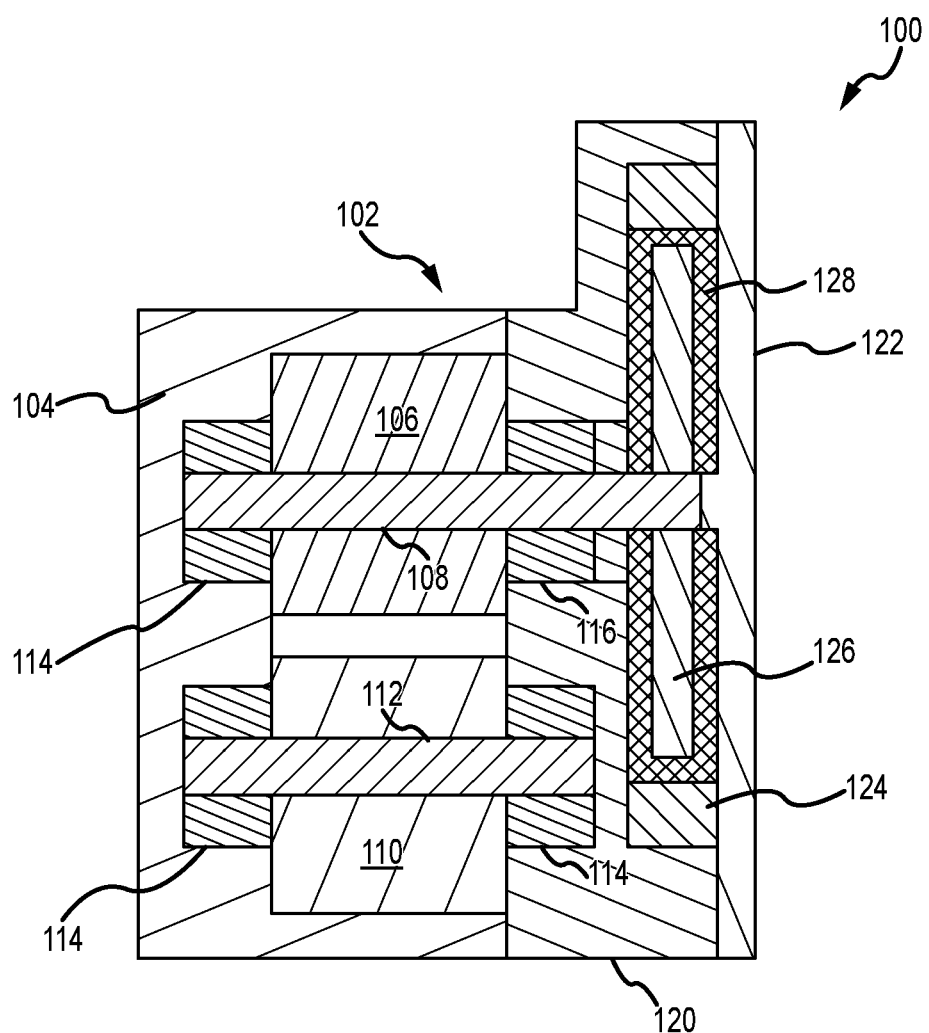
FIG. 3 is a schematic of a hydraulic fluid system that uses an integrated hydraulic motor and MRF brake, in accordance with various embodiments.

A hydraulic fluid system in accordance with various embodiments is illustrated in FIG. 3 and is identified by reference numeral 100. Generally, a hydraulic motor or gear pump (e.g., hydraulic motor 30) and an MRF brake (e.g., MRF brake 50) are integrated into a common housing assembly 102. This housing assembly 102 includes a gear pump housing 104, a brake housing 120, and a cover plate 122. The brake housing 120 includes components for an MRF brake, and furthermore closes an open end of the gear pump housing 104. The cover plate 122 seals an open end of the brake housing 120. The gear pump includes an output gear 106 and an idler gear 110. An idler gear shaft 112 is associated and rotates with the idler gear 110. A shaft 108 is associated and rotates with each of the output gear 106 (gear pump) and a rotor 126 (MRF brake). Bearings 114 may rotatably support the shaft 108 and the idler gear shaft 112. A seal 116 may be mounted on the shaft 108 adjacent to the brake housing 120 and into which the shaft 108 extends. A magnetic coil 124 may be disposed within the brake housing 120, along with a magneto-rheological fluid 128 in which the rotor 126 is disposed. An electrical control signal to the magnetic coil 124 may be used to control the braking torque exerted by the magneto-rheological fluid 128 on the rotor 126 (and any portion of the shaft 108 that also interfaces with this magneto-rheological fluid 128. Increasing the current of the electrical control signal to the magnetic coil 124 increases the viscosity of the magneto-rheological fluid 128, and thereby the increases the magnitude of the braking torque exerted by the magneto-rheological fluid 128 on the rotor 126. Decreasing the current of the electrical control signal to the magnetic coil 124 decreases the viscosity of the magneto-rheological fluid 128, and thereby decreases the magnitude of the braking torque exerted by the magneto-rheological fluid 128 on the rotor 126.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially", "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A hydraulic fluid system, comprising:
   a first hydraulic motor comprising an output;
   a first magneto-rheological fluid (MRF) brake interconnected with the output of the first hydraulic motor, the first MRF brake comprising a magneto-rheological fluid, wherein the first hydraulic motor and the first MRF brake define a first set;
   a second hydraulic motor and a second MRF brake operatively interconnected with the second hydraulic motor and that defines a second set, wherein the first set and the second set are connected in series;
   a third hydraulic motor and a third MRF brake operatively interconnected with the third hydraulic motor and that defines a third set;
   a fourth hydraulic motor and a fourth MRF brake operatively interconnected with the fourth hydraulic motor and that defines a fourth set, wherein the third set and the fourth set are connected in series, and wherein the first set and the second set are collectively connected in parallel with the third set and the fourth set; and
   a controller coupled to at least one of the first MRF brake, the second MRF brake, the third MRF brake, or the fourth MRF brake,
      wherein the controller is configured to control an amount of current flowing through a magnetic coil of the at least one of the first MRF brake, the second MRF brake, the third MRF brake, or the fourth MRF brake based on an input,
      wherein the current flowing through the magnetic coil of the at least one of the first MRF brake, the second MRF brake, the third MRF brake, or the fourth MRF brake corresponds with a viscosity of the magneto-rheological fluid of the at least one of the first MRF brake, the second MRF brake, the third MRF brake, or the fourth MRF brake, and
      wherein the input to the controller is selected from a group consisting of a differential pressure between an input side of at least one of the first hydraulic motor, the second hydraulic motor, the third hydraulic motor, or the fourth hydraulic motor and an output side of the at least one of the first hydraulic motor, the second hydraulic motor, the third hydraulic motor, or the fourth hydraulic motor and an operational speed of the at least one of the first hydraulic motor, the second hydraulic motor, the third hydraulic motor, or the fourth hydraulic motor.

2. The hydraulic fluid system of claim 1, wherein the first hydraulic motor comprises an idler gear and an output gear, and wherein said MRF brake is interconnected with the output gear.

3. The hydraulic fluid system of claim 1, further comprising:
   a hydraulic fluid circuit fluidly connected with the first hydraulic motor, wherein the magneto-rheological fluid of the first MRF brake is fluidly isolated from the hydraulic fluid circuit.

4. The hydraulic fluid system of claim 1, wherein the first MRF brake comprises a rotatable rotor disposed within the magneto-rheological fluid.

5. The hydraulic fluid system of claim 1, wherein the first hydraulic motor comprises a motor housing and the first MRF brake comprises a brake housing, and wherein the motor housing is completely separate from the brake housing.

6. The hydraulic fluid system of claim 1, further comprising a common hydraulic load fluidly connected with each of the first hydraulic motor, the second hydraulic motor, the third hydraulic motor, and the fourth hydraulic motor.

7. The hydraulic fluid system of claim 1, further comprising a housing assembly, wherein the first hydraulic motor and the first MRF brake are disposed within the housing assembly.

8. The hydraulic fluid system of claim 7, further comprising a first shaft, wherein the output comprises an output gear mounted on the first shaft at a first location, and wherein the first MRF brake comprises a rotor mounted on the first shaft at a second location that is spaced from the first location.

9. The hydraulic fluid system of claim 8, further comprising a seal engaged with the first shaft between the first location and the second location.

10. The hydraulic fluid system of claim 7, wherein the housing assembly comprises a motor housing, a brake housing, and a housing disposed between and engaged with each of the motor housing and the brake housing.

11. A method of controlling a hydraulic fluid system, comprising:
    directing a hydraulic fluid through at least one of a first hydraulic motor comprising an output, a second hydraulic motor, a third hydraulic motor, or a fourth hydraulic motor;
    applying a braking torque to the output using at least one of a first magneto-rheological fluid (MRF) brake, a second MRF brake, a third MRF brake, or a forth MRF brake, the applying comprising using a magneto-rheological fluid, wherein the first MRF brake is operatively interconnected with the first hydraulic motor and define a first set, wherein the second MRF brake is operatively interconnected with the second hydraulic motor and define a second set, wherein the first set and the second set are connected in series, wherein the third MRF brake is operatively interconnected with the third hydraulic motor and define a third set, wherein the fourth MRF brake is operatively interconnected with the fourth hydraulic motor and define a fourth set, wherein the third set and the fourth set are connected in series, and wherein the first set and the second set are collectively connected in parallel with the third set and the fourth set; and
    controlling, via a controller, a magnitude of the braking torque using a current applied to the magnetic coil of the at least one of the first MRF brake, the second MRF brake, the third MRF brake, or the fourth MRF brake,
        wherein the controller is configured to control an amount of the current flowing through a magnetic coil of the at least one of the first MRF brake, the second MRF brake, the third MRF brake, or the fourth MRF brake based on an input,
        wherein the current flowing through the magnetic coil of the at least one of the first MRF brake, the second MRF brake, the third MRF brake, or the fourth MRF brake corresponds with a viscosity of the magneto-rheological fluid of the at least one of the first MRF brake, the second MRF brake, the third MRF brake, or the fourth MRF brake and thus magnitude of the braking torque, and wherein the input to the controller is selected from a group consisting of a differential pressure between an input side of at least one of the first hydraulic motor, the second hydraulic motor, the third hydraulic motor, or the fourth hydraulic motor and an output side of the at least one of the first hydraulic motor, the second hydraulic motor, the third hydraulic motor, or the fourth hydraulic motor and an operational speed of the at least one of the first hydraulic motor, the second hydraulic motor, the third hydraulic motor, or the fourth hydraulic motor.

12. The method of claim 11, wherein the directing comprises inputting the hydraulic fluid to the first hydraulic motor and outputting the hydraulic fluid from the first hydraulic motor, wherein a pressure of the hydraulic fluid for the inputting is greater than a pressure of the hydraulic fluid for the outputting.

13. The method of claim 11, further comprising:
rotating the output of the first hydraulic motor using the directing, wherein the applying comprises applying the braking torque to the output.

14. The method of claim 11, further comprising:
isolating the hydraulic fluid from the magneto-rheological fluid.

15. The method of claim 11, wherein the applying comprises:
precluding the magneto-rheological fluid from exiting the first MRF brake and then re-entering the first MRF-brake.

* * * * *